July 11, 1933.   K. SPITZ   1,917,336

TURN-UP-TABLE

Filed June 1, 1932

Karl Spitz
INVENTOR

BY Mock & Blum
ATTORNEYS

Patented July 11, 1933

1,917,336

UNITED STATES PATENT OFFICE

KARL SPITZ, OF VIENNA, AUSTRIA

TURN-UP-TABLE

Application filed June 1, 1932, Serial No. 614,677, and in Austria June 3, 1931.

The invention relates to turn-up tables which can be fastened to an upright support such as a wall or a post, the principal object of my invention being to provide an improved turn-up table for compartments in railway-carriages. According to this invention the table has a pivot member which slides in a guide member which is fastened to the support (wall, post). The guide member and the pivot member are constructed so that the table in its inoperative position is nearly parallel to the support (to the wall). When said table is turned downwardly it is locked in a plane which is nearly perpendicular to the support, i. e. in a horizontal plane.

Figure 1:
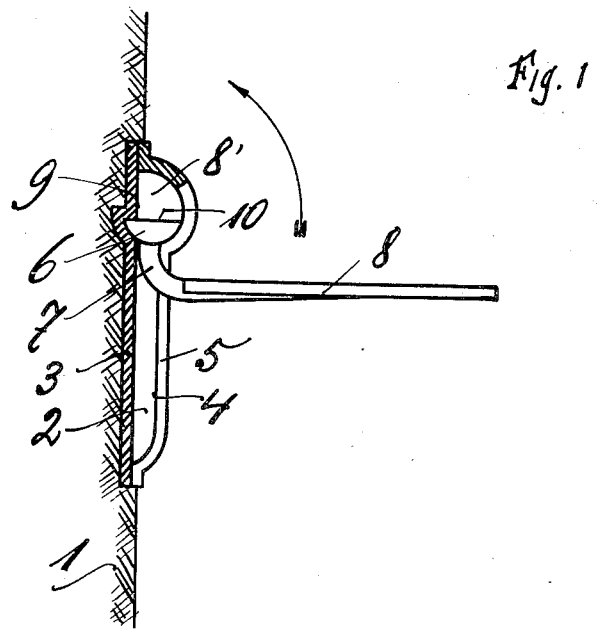
Figure 2:
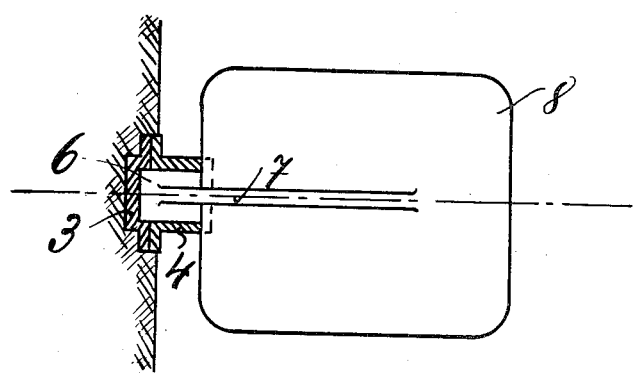

The drawing represents an embodiment of my invention in its operative position. Fig. 1 is a longitudinal vertical section through the table and Fig. 2 a plan-view thereof.

The wall 1 which constitutes the support of the turn-up table carries a nearly vertical guide member 2, which preferably consists of two parts, namely of a base plate 3 and an outer vertically slotted bar 4. The top of bar 4 is unslotted. The guide channel is located between said bar 4 and the plate 3. The curved carrying arm 7 of the table has flat vertical walls and said arm is guided in a vertical and longitudinal slot 5 of the outer face of bar 4, so that lateral swinging movement of the table is prevented. A slidable pivot member 6 is integral with the inner curved end of arm 7. The carrying arm 7 of the table extends outwardly through the longitudinal slot 5 and carries the table-board 8. The upper surface 10 of the pivot member 6 is flat. The lower curved surface of the pivot member 6 is shaped like a portion of a cylinder. The height of the pivot member equals the width of the guide channel.

At its upper end the guide channel has a substantially cylindrical enlargement 8′ the radius of curvature of which approximatively corresponds to the radius of curvature of the cylindrical lower surface of pivot 6. The wall plate 3 of the guide member 2 has a shoulder which provides a stop 9. As shown in Fig. 1, the flat face 10 of the pivot member 6 abuts the stop 9 when the member 8 is turned to the horizontal position.

In its inoperative position the table 8 is nearly parallel to the wall 1 and the pivot member 6 is located at the lower end of the guide member 2 with its flat face 10 abutting the wall plate 3 of said guide. In order to move the table 8 into its operative position, said table and the pivot member 6 are slid upwardly within the guide channel until the pivot member enters the enlargement 8′ and abuts the top end of the guide channel. In this position the table may be turned downwardly. The pivot member 6 is turned in the cylindrical enlargement 8′ until the flat face 10 of the pivot member abuts the stop 9 whereby said pivot and the table are held in position. (Fig. 1.)

Instead of the arrangement represented in the drawing in which only a single pivot member is employed, said pivot member being aligned with the median part of the table, a plurality of such pivots, e. g. two pivots can be provided. In this case no provision must be made in order to avoid a lateral swinging movement of the table, as the pivots will be in alignment with each other. The shape of the pivot member may be varied without departing from the invention. Likewise, the inclination of the table with respect to the support may be varied.

A table made according to my invention occupies a very small space. In its operative position, the table does not require a stay or a spreader and, moreover, it requires only a single bearing, while in the known folding-tables two bearings or hinges are required.

Having now described the nature and the object of my invention, what I claim as new, is:

1. A table device comprising a guide member, a table, a table-arm connected to said table only at one end thereof, said table-arm being slidable with respect to said guide, and being also turnable only within one end of said guide, but being non-turnable within the remainder of said guide, means adapted to engage and retain said table-arm in outwardly inclined position with respect to the aforesaid end of said guide, and means adapted to retain the table-arm in sliding relation to said guide, said table being turnable over the exterior of said guide and being wider than said guide.

2. A table device comprising hollow and slotted guide means having an enlargement at its upper end, a table, a table-arm connected to said table, said table-arm extending through the slot in said guide means and being so curved as to offset the table sufficiently to clear said enlargement when being turned, the inner end of said table-arm having an enlarged head which is slidably located within said guide means, said head being turnable in said enlargement and being non-turnable below said enlargement, the width of said head exceeding the operative clearance of said guide means below said enlargement, so that the table-arm can be turned when its head has been slid into said enlargement whereupon it is prevented from descending below said enlargement by the excess of the head over the clearance of said guide means, and means adapted to limit the turning of said arm so that said arm is held in outwardly inclined relation to said guide means.

3. A table device comprising hollow and slotted guide means having an enlarged operative clearance space at its upper end, a table, a table-arm connected to said table, said table-arm extending through the slot in said guide means, the inner end of said table-arm having an enlarged head adapted to be pivotally rotated within said enlarged clearance space, said enlarged head being slidably located within said guide means, being turnable in said enlargement and non-turnable below said enlargement, the width of said head exceeding the width of the interior of said guide means below said enlargement, and means adapted to limit the outward turning of said arm away from said guide means, said arm being so curved as to offset the table sufficiently to clear the enlarged portion of the guide means so that said table is turnable over said portion, thereby placing the head of the table arm into a slidable position with reference to the guide means, so that the table with its arm can be slid into an unturnable upright position.

4. A turn-up table comprising an upright standard having tubular slotted guide means, enlarged at the upper end in form of a frontal protuberance, a table, laterally extending beyond said guide means, a table-arm connected to said table, extending through the slot in the guide means and curved so as to offset said table sufficiently to clear the enlarged end portion of said guide means, the inner end of said table-arm having an enlargement in a frontal direction, adapted to be pivotally rotated within said protuberance of the guide means, but not rotatable below the same, and means to limit the turning radius of the arm and the table from an upright to a horizontal position of the latter.

In testimony thereof I have affixed my signature.

KARL SPITZ.